UNITED STATES PATENT OFFICE 2,450,266

METHOD OF PRODUCING LITHIUM HYDRIDE AND HYDRIDES OF OTHER ALKALI METALS

Peter P. Alexander, Beverly, Mass., assignor to Metal Hydrides Incorporated, Beverly, Mass., a corporation of Massachusetts No Drawing. Application May 28, 1947, Serial No. 751,130

10 Claims. (Cl. 23—204)

This invention relates to the production of lithium hydride and hydrides of other alkali metals and particularly by the reduction of the hydroxide with a reducing metal.

It has long been known that lithium hydride possesses valuable properties which renders it useful in the chemical field. Recently, however, its importance has increased greatly due principally to the discovery of its value as a reagent in the production of a double hydride of lithium and aluminum which possesses novel properties as a reducing agent and for use in the synthesis of many organic compounds. It is desirable, therefore, to make lithium hydride available at as low cost as possible.

The production of lithium hydride by first reducing lithium oxide with silicon to obtain lithium metal and then distilling the lithium and introducing hydrogen to form the hydride is described in my Patent No. 2,408,748, dated October 8, 1946. In my copending application Serial No. 711,841, filed November 23, 1946, I have described the production of lithium hydride by reducing lithium oxide with magnesium or other reducing metal in the presence of introduced hydrogen.

The method of the present invention is distinguished fundamentally from the methods described in my above mentioned patent and copending application by the direct reduction of lithium hydroxide by heating with a reducing metal, the source of hydrogen being derived from the hydroxide itself.

Lithium hydroxide (LiOH.H₂O) is available at low cost. When this product is heated, it loses its water of crystallization and forms anhydrous lithium hydroxide (LiOH). Complete removal of the water of crystallization can be effected at a temperature substantially below that at which dissociation of anhydrous lithium hydroxide begins. In its anhydrous form it is most suitable for reaction with a reducing metal in accordance with the invention.

In the present preferred practice of the invention, the anhydrous lithium hydroxide is mixed with a finely divided reducing metal and formed into small briquettes which are introduced into the retort of a furnace of the type shown in my above mentioned patent. The briquetted mixture then is heated to a temperature of about 300° C. to start the reaction which is exothermic and proceeds without further external heating. The reaction takes place vigorously at a temperature of about 400° C. The temperature, preferably should not be permitted to rise above the dissociation temperature of the lithium hydroxide. Lithium hydroxide may be heated to a temperature of about 550° C. without substantial dissociation. Complete dissociation of the hydroxide requires a substantially higher temperature. If necessary a cooling fluid may be circulated around the retort to control the temperature. The reaction should be conducted in the absence of air and, preferably, under vacuum. If desired, the retort may be evacuated and an inert gas, such as argon or helium, introduced to place the retort under pressure slightly in excess of atmospheric pressure. Hydrogen may be used although it is not necessary for the reaction. The reaction proceeds rapidly to completion. When exothermic heat ceases, the reaction is complete and the charge may be removed from the retort after cooling. Lithium hydride melts at 680° C. and dissociates at a very much higher temperature. Obviously, the temperature used should be below the dissociation temperature of the alkali metal hydride and for economical reasons should not exceed about 900° C.

While I do not wish to limit my invention to any particular theory, I believe that when the temperature used is below the dissociation temperature of anhydrous lithium hydroxide the reaction may be represented as follows:

$$\mathrm{LiOH + Mg \rightarrow MgO + LiH}$$

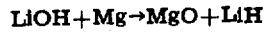

Various reducing metals or metalloids may be employed in the practice of the invention, such as aluminum, silicon, magnesium and chromium. The hydrides of other alkali metals may be produced in a similar manner by reduction of the hydroxide with a reducing metal. The heat of formation of the oxide of the reducing metal used plus the heat of formation of the hydride of the alkali metal should be greater than the heat of formation of the alkali metal hydroxide.

When lithium hydride is produced in accordance with the invention for use as a reagent in the production of the double hydride of lithium and aluminum, the reaction mixture may be used as the reagent without previous separation of the lithium hydride. In such case I presently prefer to employ aluminum as the reducing metal in the reduction of lithium hydroxide.

The invention may be practiced in various ways. Instead of mixing the lithium hydroxide in finely divided form with a finely divided reducing metal as previously described for the purpose of illustration, the melted reducing metal may be introduced at a controlled rate into a bath of melted hydroxide or vice versa. The relative proportions of the reactants used may be molecular equivalents with a slight excess or as much as 100 per cent excess reducing metal depending upon the particular procedure employed.

The methods described in my previously mentioned patent and copending application make possible the production of lithium hydride at a cost considerably less than when produced by methods theretofore available, but they require the use of lithium oxide. The preparation of lithium oxide by calcining lithium hydroxide requires a high temperature and is expensive. This expensive operation is eliminated by the present invention. Furthermore, the method of the present invention may be conducted at a temperature below the melting temperature of lithium hydroxide which is below the minimum temperature required for the reduction of lithium oxide. An outstanding advantage of the process of the invention is that it can be used in localities where hydrogen is not available since all the hydrogen required is derived from the hydroxide used and no external source of hydrogen is necessary.

I claim:

1. The mehtod of producing hydrides of alkali metals which comprises heating the anhydrous hydroxide of an alkali metal with a reducing metal in a reaction zone in the absence of air to a temperature below the dissociation temperature of the alkali metal hydroxide about but above 300° C.

2. The method of producing lithium hydride which comprises heating anhydrous lithium hydroxide with a reducing metal in a reaction zone in the absence of air to a temperature between about 300° C. to 550° C.

3. The method of producing hydrides of alkali metals which comprises heating the anhydrous hydroxide of an alkali metal with aluminum in the absence of air to a temperature below the dissociation temperature of the alkali metal hydroxide but above about 300° C.

4. The method of producing hydrides of alkali metals which comprises heating the anhydrous hydroxide of an alkali metal with magnesium in the absence of air to a temperature below the dissociation temperature of the alkali metal hydroxide but above about 300° C.

5. The method of producing hydrides of alkali metals which comprises heating the anhydrous hydroxide of an alkali metal with silicon in the absence of air to a temperature below the dissociation temperature of the alkali metal hydroxide but above about 300° C.

6. The method of producing lithium hydride which comprises heating anhydrous lithium hydroxide with aluminum in a reaction zone in the absence of air to a temperature between about 300° C. to 550° C.

7. The method of producing lithium hydride which comprises heating anhydrous lithium hydroxide with silicon in a reaction zone in the absence of air to a temperature between about 300° C. to 550° C.

8. The method of producing lithium hydride which comprises heating anhydrous lithium hydroxide with magnesium in a reaction zone in the absence of air to a temperature between 300° C. to 550° C.

9. The method of producing hydrides of alkali metals which comprises heating the hydroxide of an alkali metal with a reducing metal at a temperature above 300° C. but below the dissociation temperature of the alkali metal hydride.

10. The method of producing lithium hydride which comprises heating lithium hydroxide with a reducing metal at a temperature above 300° C. but below the dissociation temperature of lithium hydride.

PETER P. ALEXANDER.

No references cited.

Certificate of Correction

Patent No. 2,450,266.                                    September 28, 1948.

PETER P. ALEXANDER

It is hereby certified that errors appear in the printed specification of the above numbered patent requiring correction as follows:

Column 2, line 46, for "alumnium" read *aluminum*; column 3, line 24, claim 1, for "mehtod" read *method*; line 29, same claim, strike out the word "about" and insert the same after "above" same line;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.* equivalents with a slight excess or as much as 100 per cent excess reducing metal depending upon the particular procedure employed.

The methods described in my previously mentioned patent and copending application make possible the production of lithium hydride at a cost considerably less than when produced by methods theretofore available, but they require the use of lithium oxide. The preparation of lithium oxide by calcining lithium hydroxide requires a high temperature and is expensive. This expensive operation is eliminated by the present invention. Furthermore, the method of the present invention may be conducted at a temperature below the melting temperature of lithium hydroxide which is below the minimum temperature required for the reduction of lithium oxide. An outstanding advantage of the process of the invention is that it can be used in localities where hydrogen is not available since all the hydrogen required is derived from the hydroxide used and no external source of hydrogen is necessary.

I claim:

1. The mehtod of producing hydrides of alkali metals which comprises heating the anhydrous hydroxide of an alkali metal with a reducing metal in a reaction zone in the absence of air to a temperature below the dissociation temperature of the alkali metal hydroxide about but above 300° C.

2. The method of producing lithium hydride which comprises heating anhydrous lithium hydroxide with a reducing metal in a reaction zone in the absence of air to a temperature between about 300° C. to 550° C.

3. The method of producing hydrides of alkali metals which comprises heating the anhydrous hydroxide of an alkali metal with aluminum in the absence of air to a temperature below the dissociation temperature of the alkali metal hydroxide but above about 300° C.

4. The method of producing hydrides of alkali metals which comprises heating the anhydrous hydroxide of an alkali metal with magnesium in the absence of air to a temperature below the dissociation temperature of the alkali metal hydroxide but above about 300° C.

5. The method of producing hydrides of alkali metals which comprises heating the anhydrous hydroxide of an alkali metal with silicon in the absence of air to a temperature below the dissociation temperature of the alkali metal hydroxide but above about 300° C.

6. The method of producing lithium hydride which comprises heating anhydrous lithium hydroxide with aluminum in a reaction zone in the absence of air to a temperature between about 300° C. to 550° C.

7. The method of producing lithium hydride which comprises heating anhydrous lithium hydroxide with silicon in a reaction zone in the absence of air to a temperature between about 300° C. to 550° C.

8. The method of producing lithium hydride which comprises heating anhydrous lithium hydroxide with magnesium in a reaction zone in the absence of air to a temperature between 300° C. to 550° C.

9. The method of producing hydrides of alkali metals which comprises heating the hydroxide of an alkali metal with a reducing metal at a temperature above 300° C. but below the dissociation temperature of the alkali metal hydride.

10. The method of producing lithium hydride which comprises heating lithium hydroxide with a reducing metal at a temperature above 300° C. but below the dissociation temperature of lithium hydride.

PETER P. ALEXANDER.

No references cited.

Certificate of Correction

Patent No. 2,450,266.   September 28, 1948.

PETER P. ALEXANDER

It is hereby certified that errors appear in the printed specification of the above numbered patent requiring correction as follows:

Column 2, line 46, for "alumnium" read *aluminum*; column 3, line 24, claim 1, for "mehtod" read *method*; line 29, same claim, strike out the word "about" and insert the same after "above" same line;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.*